United States Patent [19]
Holleyman

[11] 3,925,984
[45] Dec. 16, 1975

[54] COMPRESSED AIR POWER PLANT
[76] Inventor: John E. Holleyman, 3402 Polk St., Monroe, La. 71201
[22] Filed: Dec. 10, 1974
[21] Appl. No.: 530,561

Related U.S. Application Data
[63] Continuation-in-part of Ser. No. 419,551, Dec. 5, 1973, abandoned.

[52] U.S. Cl. .................. 60/370; 60/371; 60/412; 180/66 B
[51] Int. Cl.² ........................................ F15B 11/06
[58] Field of Search ............. 60/412, 325, 370, 371, 60/407, 409, 413, 416; 180/66 B

[56] References Cited
UNITED STATES PATENTS

| 1,065,425 | 6/1913 | Basinski | 60/407 |
| 1,251,849 | 1/1918 | Vernon | 60/410 |
| 1,961,465 | 6/1934 | Thompson | 60/410 |
| 3,563,032 | 2/1971 | La Pointe | 60/412 X |
| 3,765,180 | 10/1973 | Brown | 60/370 |

OTHER PUBLICATIONS
Washington Evening Star article of Oct. 20, 1931, and Washington Herald articles of Oct. 22, 1931 and Nov. 2, 1931, relating to air motors for automobiles, Meyers & Anania "Inventors."

Primary Examiner—Edgar W. Geoghegan
Attorney, Agent, or Firm—Raymond N. Matson

[57] ABSTRACT

A compressed air power plant for land, air and marine vehicles which is extremely efficient and 100% pollution free so as to be ecologically invaluable. The power plant operates on compressed air from tanks replenished by battery powered air compressors operating in two consecutive or simultaneous stages.

9 Claims, 7 Drawing Figures

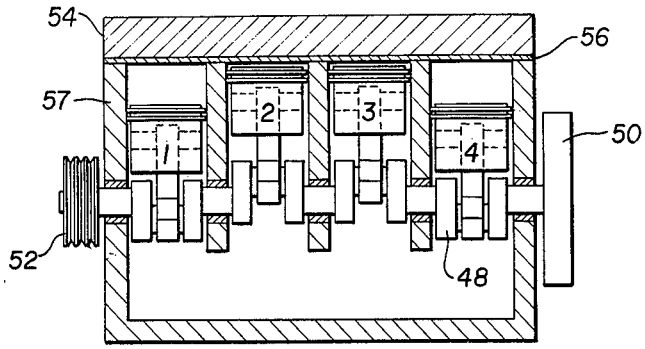
FIG.3
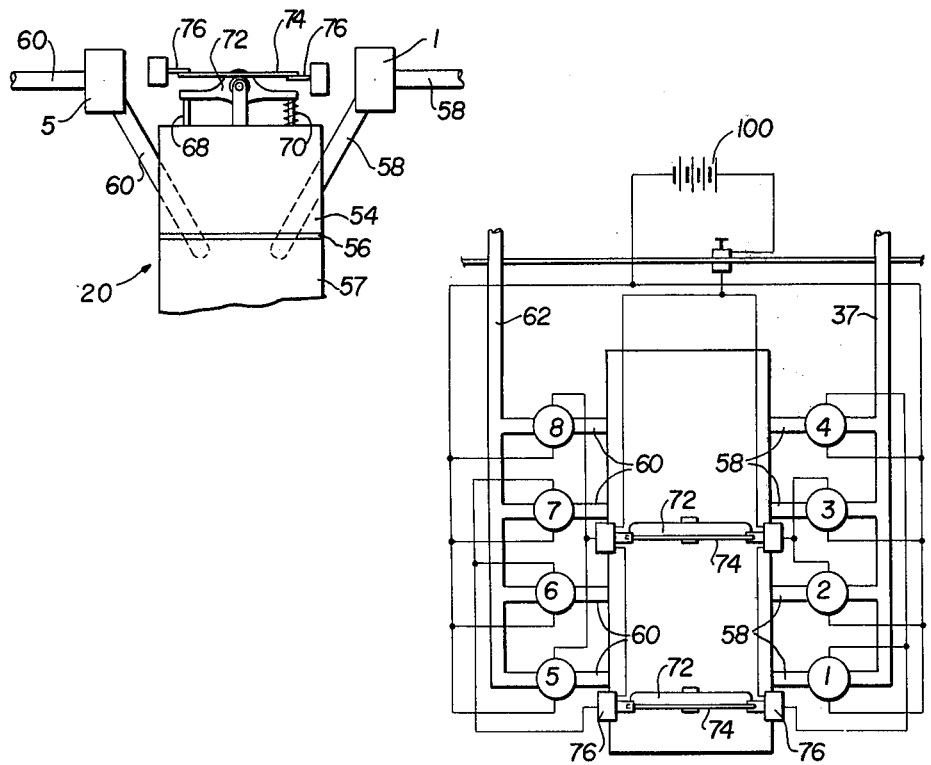
FIG.4
FIG.5

COMPRESSED AIR POWER PLANT

This application is a continuation-in-part of application Ser. No. 419,551 filed Dec. 5, 1973, now abandoned.

This invention relates generally to power plants for land, sea and air vehicles and more particularly to a piston type engine powered by compressed air from a self-replenishing system.

Power plants of this general type are known in the art but have not had general acceptance for a number of reasons. Among these are: an unacceptably low efficiency in operation; an impractical arrangement and use of associated elements; a severe limitation as to running time due to ill-conceived, non-existent or inadequate compressed air replenishing means; and to poor engineering.

Accordingly, the main object of the present invention is to provide an improved compressed air power plant which obviates the disadvantages and inadequacies of known systems.

An important object of the present invention is to provide an improved, highly efficient power plant which is self-replenishing and will run for practical periods of time after which energy providing batteries may be readily recharged or replaced.

A further important object of the present invention is to provide an extremely efficient compressed air power plant from a conventional internal combustion engine by eliminating the conventional ignition system, carburetor, cooling system, etc. and substituting therefor means for providing compressed air to and from the pistons and suitable controls therefor to effect rotation of the crankshaft and drive shaft thereof and propulsion of the vehicle.

A still further important object of the present invention is to provide a simple, efficient, relatively lightweight compressed air propulsion system for vehicles which eliminates a conventional cooling system and the exhaust fumes of an internal combustion engine while providing the flexibility and reliability thereof.

Other objects and advantages of the present invention will become apparent during the course of the following description.

In the drawings I have shown one embodiment of the invention.

In this showing,

FIG. 3 is a central vertical sectional view to an enlarged scale of the piston type engine which is powered by compressed air;

FIG. 4 is a fragmentary diagrammatic end view thereof showing the intake and exhaust conduits and 12 volt solenoid operated valves for compressed air, and the rocker arm closed electric switches which control the intake and exhaust valves;

FIG. 5 is a diagrammatic top plan view thereof;

Figure 1:
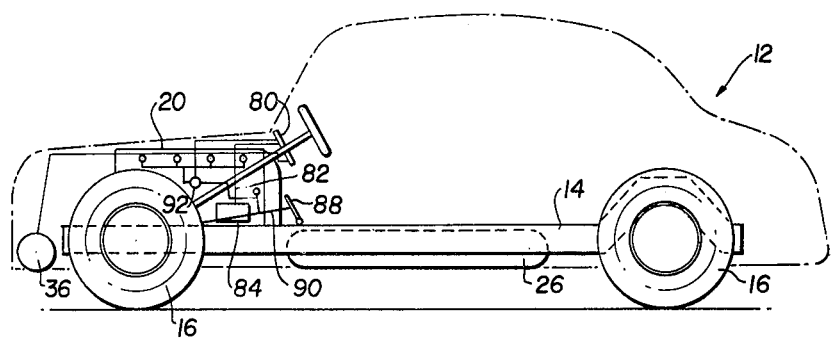
FIG. 1 is a diagrammatic side elevational view of the compressed air power plant as applied to a land vehicle.
Figure 2:
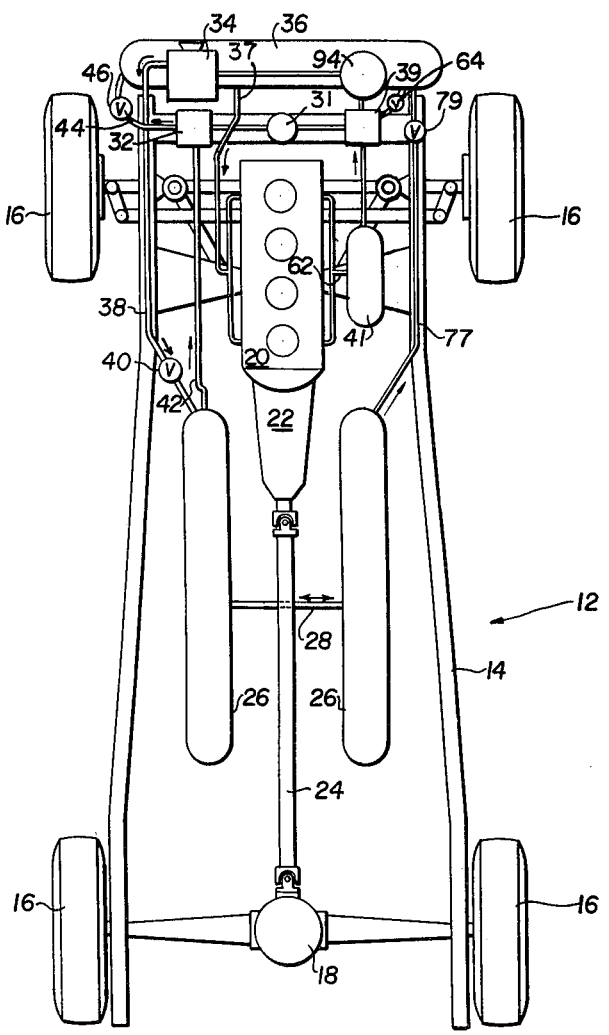
FIG. 2 is a diagrammatic plan view thereof showing the basic elements of the power plant with certain parts omitted for clarity.

Referring to FIGS. 1 and 2 of the drawings, there is shown a land vehicle such as a conventional internal combustion engine auto 12 converted for use by compressed air power which includes the usual chassis 14, supporting wheels 16, differential 18, piston type engine 20, transmission 22, and connecting drive shaft 24.

In addition to the converted engine 20, the chassis 14 supports the other basic elements of the present invention (FIG. 2) which include a pair of low pressure compressed air tanks 26 connected by a conduit 28 having a dash mounted air pressure actuated switch valve 30, a low pressure compressor 34 being the main compressor, a high pressure pump 32 driven by a motor 31, and a high pressure compressed air tank 36. The main compressor 34 is connected to one of the low pressure tanks 26 by a line 38 having a check valve 40 and the same low pressure tank 26 is connected to the high pressure pump 32 by a line 42 and thence to the high pressure tank 36 by a line 44 having a check valve 46.

The converted internal combustion engine 20 shown is timed along with its rebuilt camshaft (not shown) to inject cylinders number 1 and 4 (FIGS. 3 and 5) at the same time with compressed air from high pressure tank 36 through line 37 (FIG. 7) to drive them downwardly and as they return toward the top of their stroke, their valves are opened to exhaust and compressed air is exhausted to the exhaust tank 41 from where it is pumped by means of high pressure exhaust pump 39 back through check valve 64 into high pressure tank 36. Compressed air is then admitted to cylinders 2 and 3 which move downwardly to thus rotate the crankshaft 48, its fly-wheel 50 and at its opposite end, a three belt pulley 52.

Figure 6:
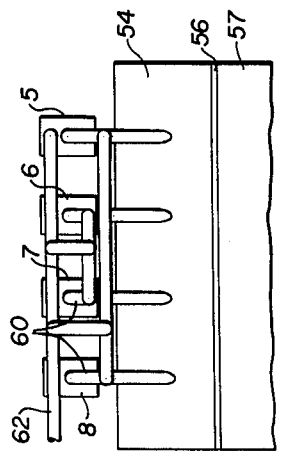
FIG. 6 is a diagrammatic side elevational view of the compressed air exhaust line and exhaust frame.

As seen in FIGS. 4 and 5, the engine 20 includes a head 54, an intermediate spacing plate 56, a block 57, 12 volt intake solenoid operated valves 1, 2, 3 and 4 mounted in manifold lines 58, exhaust 12 volt solenoid operated valves 5, 6, 7 and 8 mounted in manifold exhaust lines 60 (FIGS. 5 and 6) which connect with exhaust line 62 which connects into exhaust tank 41 (FIG. 7) and then to high pressure exhaust pump 39 which pumps the exhaust air into the high pressure tank 36 by way of the check valve 64. The exhaust air is pumped to the tank 36 by the high pressure exhaust pump 39, powered by a 36 volt electric motor 31 which has as its source of energy, six 6-volt batteries.

The solenoid operated valves are controlled by the camshaft (not shown) through push rods 68 (FIG. 4) having a return spring 70 which actuate two rocker arms 72 each of which is provided with a switch plate 74 in the form of a ⅛ inch steel bar welded to each. Projecting toward and under the ends of the switch plates 74 from the solenoid operated valves 1, 3, 5 and 7 are relay switch contacts 76. As seen in FIGS. 4 and 5, intake solenoid operated valves 1 and 4 will be opened and closed by the lower intake relay switch 76 while at the same time exhaust solenoid valves 6 and 7 will be opened and closed by the upper relay switch 76.

When intake solenoid operated valves 1 and 4 open, allowing 500 to 700 p.s.i. of air pressure into number 1 and number 4 cylinders (FIGS. 3, 4 and 5), exhaust solenoid operated valves 6 and 7 open at the same time allowing the remaining air under pressure in number 2 and number 3 cylinders to be forced back into the exhaust tank 41 and pumped out by high pressure exhaust pump 39 through check valve 64 into high pressure tank 36. Similarly and in turn, intake solenoid operated valves 2 and 3 are operated by their push rod 68 to admit air pressure into cylinders 2 and 3 while the rocker arm 72 operates the upper exhaust relay switch 76 to open and close solenoid operated valves 6 and 7, allowing the remaining air pressure in number 1 and number 4 cylinders to pass into exhaust tank 41 and then be pumped by high pressure exhaust pump 39 into tank 36.

The compressed air power plant is readily adapted to a land vehicle such as an auto as shown in FIG. 1. The normal controls are positioned on a dash board 80 with a wire 82 to an electric starter 84 powered by a 12 volt battery 86. The accelerator pedal 88 is connected by a rod 90 to an accelerator valve 92 which controls the flow of compressed air from the high pressure tank 36 through the line 37 to the engine pistons.

The main compressor 34 pumps compressed air from its air inlet through line 38 and check valve 40 into the low pressure tanks 26 which are connected by line 28 and by line 77 initially into tank 36 until the pressure reaches about 150 p.s.i. at which time the air pressure switch 30 mounted on the dash 80 cuts off the 36 volt electric motor 94 driving the main compressor 34. Conversely, when the pressure in the tanks 26 falls below 125 lbs. p.s.i., the air pressure switch 30, being responsive to the pressure in line 28 through line 28' cuts the main compressor 34 back on.

Figure 7:
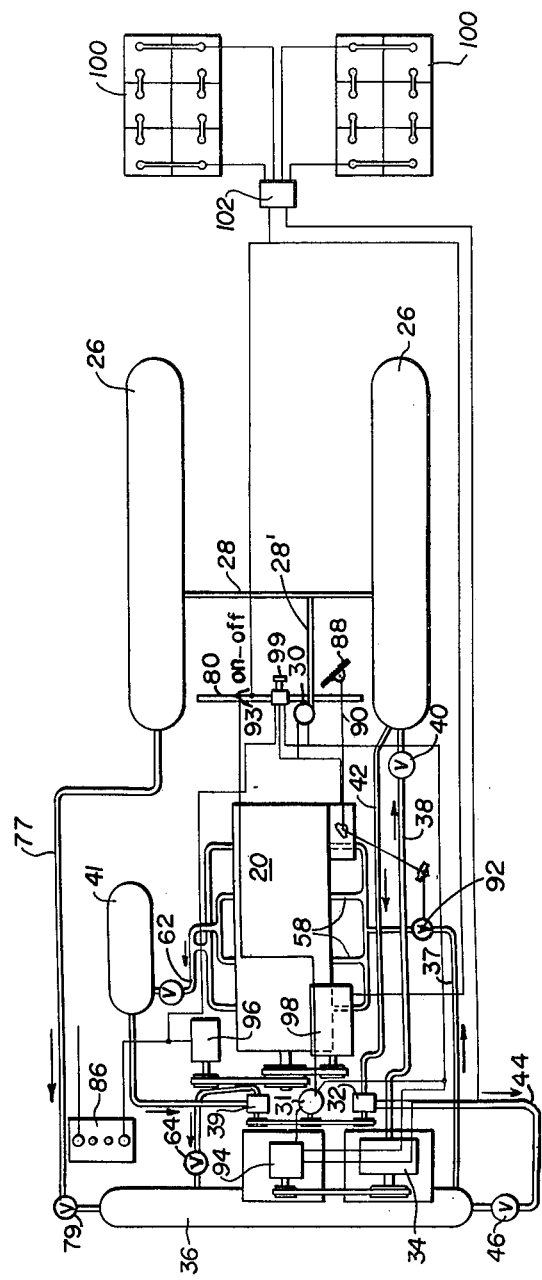
FIG. 7 is a diagrammatic top plan view of the control and drive means for the basic elements of the invention with certain parts being omitted for clarity.

When the higher pressure is reached, and the main compressor 34 shuts off, this will be apparent to the vehicle operator who will then manually turn on a switch 93 mounted on the dash board 80 to turn on the high pressure pump 32 which is driven by the motor 31 (FIG. 7). This will raise the pressure in the high pressure tank 36 to over 500 p.s.i.

In the operation of the compressed air power plant as applied to the auto shown, and assuming that all compressed air tanks are empty and the batteries charged, the main compressor 34 which is powered by one of the 36 volt battery packs 100, is turned on by a dash board switch 99. When the air pressure is sufficient in all tanks as indicated above, the starter 84 (FIG. 1) is energized to start the engine 20 turning at which time the accelerator valve 92 (FIG. 1) will only close approximately 70% allowing only 200 p.s.i. air pressure through the intake line 37 to idle the engine.

A 36 volt motor 31 powered by six 6 volt batteries drives the high pressure exhaust pump 39 which pulls air out of exhaust tank 41 back through the check valve 64 into the high pressure tank 36. Upon operation of the main compressor 34, the first low pressure tank 26 builds up pressure, which will pass to the second low pressure tank 26 through line 28 and through line 42 to high pressure pump 32, from which it flows through line 44 and check valve 46 into high pressure tank 36. These two low pressure tanks 26 thus supply the air to the high pressure pump 32 by means of line 42 and initially only to the pressure tank 36 by line 77.

As air is drawn from the high pressure tank 36 to the intake manifold 37, the pressure decreases in the high pressure tank 36. As shown, the compressor 34 is powered by a 36 volt electric motor 94 and when the pressure in the high pressure tank 36 is used up down to 125 p.s.i., the pressure switch 30 will energize the electric motor 94 starting the main air compressor 34. A dash board switch 93 (FIG. 7) is cut on to start the high pressure pump 32 to build up the pressure from 150 p.s.i. to above 500 p.s.i. as previously explained. As the accelerator 88 (FIG. 1) is depressed, it will open the accelerator valve 92 to increase the speed of the engine.

The 37 amp alternator 96 (FIG. 7) will recharge the 12 volt battery 86 which operates the solenoid valves, switches, lights, etc. The 65 amp alternator 98 recharges the 36 volt battery packs which are the source of energy for the 36 volt electric motors.

A relay switch 102 is positioned between the two 36 volt battery packs 100 and when one battery pack is 90% uncharged, the relay switch 102 will switch to the other while the 65 amp alternator 98 recharges the first one. Six volt batteries are employed to make up the battery packs 100 and they are provided with a 115 volt battery charger which can be plugged into any wall socket.

It is to be understood that the form of my invention herewith shown and described is to be taken as a preferred example of the same and that various changes in the shape, size and arrangements of parts may be resorted to without departure from the spirit of the invention or the scope of the subjoined claims.

What is claimed is:

1. A noxious exhaust-gas-free compressed air power plant for vehicles comprising, in combination, a piston and cylinder type engine having a drive shaft; manifold means for admitting equally highly compressed air to and discharging it from each of the cylinders of said engine to effect reciprocation of the pistons and rotation of the shaft; low and high pressure compressed air tanks; a battery powered compressor for compressing air and delivering it to said tanks; and a battery powered high pressure pump manually actuatable upon a drop in pressure in said high pressure tank to further compress air from said low pressure tank, and deliver it to said high pressure tank for delivery to said engine manifold means.

2. The combination recited in claim 1 wherein said compressor and said pump are driven by electric motors.

3. The combination recited in claim 2 wherein power for said motors is furnished by rechargeable batteries.

4. The combination recited in claim 1 wherein said admitting and discharging means comprise solenoid operated valves.

5. The combination recited in claim 4 wherein said valves are timed to admit compressed air to one cylinder of said engine while discharging compressed air from an adjacent cylinder.

6. The combination recited in claim 1 wherein said discharged compressed air is received in an exhaust tank, and a high pressure exhaust pump delivers said discharged air from said exhaust tank to said high pressure tank.

7. The combination recited in claim 1 wherein an accelerator pedal operated valve controls the flow of high pressure compressed air from said high pressure tank to said engine.

8. The combination with a vehicle having a piston and cylinder type engine operable by compressed air; of at least one low pressure tank and one high pressure tank; first means manually and then automatically operable for compressing air in said low pressure tank to a given pressure; second manually actuated means for raising said given pressure and delivering said air to said high pressure tank; individual automatically and manually actuated means for turning off and on said first means and manually actuated means for turning off and on said second means when said given pressures are reached or lowered through use of the compressed air by said engine; and manifold means for delivering equally high pressured air to each of said pistons in said cylinders and exhausting it therefrom to effect reciprocation thereof and rotation of the drive shaft and wheels of the vehicle.

9. The combination with a vehicle having a piston and cylinder type internal combustion engine converted to operation by compressed air; of a plurality of compressed air storage tanks mounted on the chassis of the vehicle; plural compressor means for compressing air and delivering it to said tanks; and manual means for energizing at least one of said compressors upon a drop in pressure in said tanks to ensure the manifold delivery of equally highly compressed air to each of the pistons of said engine to effect rotation of the drive shaft and wheels of the vehicle.

* * * * *